United States Patent
Shin et al.

(10) Patent No.: US 10,101,512 B2
(45) Date of Patent: Oct. 16, 2018

(54) POLARIZING PLATE AND LIQUID CRYSTAL DISPLAY INCLUDING THE SAME

(71) Applicant: SAMSUNG SDI CO., LTD., Yongin-si, Gyeonggi-do (KR)

(72) Inventors: Kwang Ho Shin, Uiwang-si (KR); Dong Yoon Shin, Uiwang-si (KR); Yeon Ju Jung, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/838,327

(22) Filed: Aug. 27, 2015

(65) Prior Publication Data

US 2016/0062011 A1     Mar. 3, 2016

(30) Foreign Application Priority Data

Aug. 29, 2014 (KR) .......................... 10-2014-0114585

(51) Int. Cl.
| | | |
|---|---|---|
| G02B 5/30 | (2006.01) | |
| G02F 1/1335 | (2006.01) | |
| G02B 1/14 | (2015.01) | |

(52) U.S. Cl.
CPC ........... *G02B 5/305* (2013.01); *G02B 5/3033* (2013.01); *G02B 5/3083* (2013.01);
(Continued)

(58) Field of Classification Search
CPC ...... G02B 5/30; G02B 5/3033; G02B 5/3041; G02B 5/305; G02B 5/3083; G02B 1/105;
(Continued)

(56) References Cited

U.S. PATENT DOCUMENTS

| | | | |
|---|---|---|---|
| 2009/0135345 A1* | 5/2009 | Yajima | ................ B29C 47/0021 349/96 |
| 2010/0020396 A1* | 1/2010 | Izumi | ................ G02F 1/133528 359/485.01 |

(Continued)

FOREIGN PATENT DOCUMENTS

| | | |
|---|---|---|
| CN | 101180554 A | 5/2008 |
| CN | 103033984 A | 4/2013 |

(Continued)

OTHER PUBLICATIONS

Korean Office action dated Sep. 13, 2016, corresponding to Korean Patent Application No. 10-2014-0114585 (5 pages).

(Continued)

*Primary Examiner* — Stephone B Allen
*Assistant Examiner* — Adam W Booher
(74) *Attorney, Agent, or Firm* — Lewis Roca Rothgerber Christie LLP

(57) ABSTRACT

A polarizing plate includes a polarizer and a polyester film formed on an upper side of the polarizer. The polyester film has a ratio of MD elongation to TD elongation of about 1:6 to about 1:30. An angle between the transmission axis of the polarizer and the TD of the polyester film ranges from about −7° to about +7°. In some embodiments, a liquid crystal display includes the polarizing plate. The polarizing plate and the liquid crystal display can reduce the occurrence of rainbow spots, realize a high degree of polarization, and exhibit little variation in the retardation and dimensions under high temperature/high humidity conditions.

9 Claims, 2 Drawing Sheets

(52) U.S. Cl.
CPC .......... *G02F 1/133528* (2013.01); *G02B 1/14* (2015.01); *G02F 2202/40* (2013.01)

(58) Field of Classification Search
CPC ... G02B 1/14; G02B 1/16; G02B 1/18; G02B 27/28; G02B 27/286; G02F 1/133528; G02F 2001/133531; G02F 2001/133541–2001/133548; B29C 55/00; B29C 55/005; B29C 55/02; B29C 55/04; B29C 55/08; B29C 55/10; B29C 55/12; B29C 55/16
USPC .......................................... 359/485.01–489.13
See application file for complete search history.

(56) References Cited

U.S. PATENT DOCUMENTS

| | | | | |
|---|---|---|---|---|
| 2013/0162930 A1* | 6/2013 | Shin | .................... | G02F 1/13362 349/62 |
| 2013/0165597 A1* | 6/2013 | Kim | .................... | C09J 175/04 525/342 |
| 2014/0071379 A1* | 3/2014 | Takahashi | ......... | G02F 1/133528 349/62 |
| 2015/0210023 A1* | 7/2015 | Merrill | .................... | B29C 55/08 264/1.34 |
| 2016/0048057 A1* | 2/2016 | Sekiguchi | ......... | G02F 1/133528 349/61 |

FOREIGN PATENT DOCUMENTS

| | | |
|---|---|---|
| CN | 103885112 A | 6/2014 |
| JP | 2008-3541 A | 1/2008 |
| JP | 2012128099 A | 7/2012 |
| JP | 2014-044390 A | 3/2014 |
| KR | 10-2013-0143476 A | 12/2013 |
| TW | 201329584 A1 | 7/2013 |
| TW | 201348823 A | 12/2013 |
| TW | 201400934 A | 1/2014 |
| WO | WO 2014/017457 A1 | 1/2014 |

OTHER PUBLICATIONS

Taiwan Office action dated Sep. 9, 2016, corresponding to Taiwanese Patent Application No. 104128042 (4 pages).
Chinese Office Action dated Jun. 20, 2017 in corresponding Chinese Patent Application No. 201510542615.1 (5 pages).

* cited by examiner

POLARIZING PLATE AND LIQUID CRYSTAL DISPLAY INCLUDING THE SAME

CROSS-REFERENCE TO RELATED APPLICATION

This application claims priority to and the benefit of Korean Patent Application No. 10-2014-0114585, filed on Aug. 29, 2014 in the Korean Intellectual Property Office, the entire content of which is incorporated herein by reference.

BACKGROUND

1. Technical Field

Embodiments of the present invention relate to a polarizing plate and a liquid crystal display including the same.

2. Description of the Related Art

Liquid crystal displays (LCDs) can be manufactured to be thinner than other displays and to have low power consumption. Thus, LCDs are used in various devices, such as TVs, monitors, electronic clocks, and mobile phones.

An LCD transmits or reflects light by adjusting the orientation of liquid crystals to display images. In such an LCD, a polarizing plate is placed on an upper or lower side of a liquid crystal panel to more accurately adjust light passing therethrough.

Generally, a polarizing plate for an LCD includes a polarizer and protective films. Conventionally, cellulose films, such as triacetyl cellulose (TAC) films, have been used as protective films for polarizing plates. However, cellulose films exhibit insufficient heat resistance and moisture resistance. Thus, when a polarizing plate including such a cellulose film is used for a long period of time under a high temperature or high humidity atmosphere, the polarizing plate is likely to suffer deteriorations in the degree of polarization, separation of the polarizer from the protective film, and degradation in optical properties.

In an attempt to solve these problems, a polyester protective film for the polarizing plate has been proposed, such as one having a water vapor permeability of 700 g/m².day or less, and an in-plane retardation of 500 nm or greater. However, such a polarizing plate suffers from the occurrence of color shading (e.g., rainbow spots) and a low degree of polarization.

SUMMARY

In accordance with embodiments of the present invention, a polarizing plate includes a polarizer and a polyester film formed on an upper side of the polarizer. The polyester film has a ratio of machine direction (MD) elongation to transverse direction (TD) elongation of about 1:6 to about 1:30. Also, an angle between the transmission axis of the polarizer and the TD of the polyester film ranges from about −7° to about +7°.

The polyester film may have a crystallinity of about 50% to about 100%.

The polyester film may have an in-plane retardation (Re) at a wavelength of 550 nm of about 5,000 nm to about 15,000 nm, as calculated by Equation 1. Additionally, the polyester film may have an out-of-plane retardation (Rth) at a wavelength of 550 nm of about 6,000 nm to about 18,000 nm, as calculated by Equation 2.

Equation 1

$$Re=(nx-ny)\times d \quad (1)$$

Equation 2

$$Rth=[\{(nx+ny)/2\}-nz]\times d \quad (2)$$

In Equations 1 and 2, nx, ny, and nz are the indices of refraction in the MD (x-axis), the TD (y-axis) and the thickness direction (z-axis) of the polyester film, respectively. The x-axis, y-axis, and z-axis are orthogonal to one another, and d is a thickness of the film in nm.

The polyester film may have a degree of biaxiality (NZ) at a wavelength of 550 nm of about 1.0 to about 1.8, as calculated by Equation 3.

$$NZ=(nx-nz)/(nx-ny) \quad (3)$$

In Equation 3, nx, ny, and nz are the indices of refraction in the MD (x-axis), the TD (y-axis), and the thickness direction (z-axis) of the polyester film, respectively. The x-axis, the y-axis, and the z-axis are orthogonal to each other.

The polyester film may be formed of at least one of a polyethylene terephthalate (PET) resin, a polybutylene terephthalate resin, a polyethylene naphthalate resin, and/or a polybutylene naphthalate resin.

The polarizing plate may further include an adhesive layer formed of a solvent-free adhesive between the polarizer and the protective film.

The solvent-free adhesive may include about 90 wt % to about 95 wt % of a (meth)acrylic adhesive resin, and about 5 wt % to about 10 wt % of an isocyanate curing agent.

The polarizing plate may further include an optical film formed on a lower side of the polarizer.

In accordance with embodiments of the present invention, a liquid crystal display includes the polarizing plate described herein.

Embodiments of the present invention provide a polarizing plate which reduces the occurrence of rainbow spots despite the presence of a polyester protective film for polarizing plates. The polarizing plate has a degree of polarization as high as 99.99% or greater, allows easy formation of an optical axis, and thus exhibits good processability and productivity, and has little variation in the retardation and dimensions under high temperature/high humidity conditions. In some embodiments, a liquid crystal display employs the polarizing plate.

DETAILED DESCRIPTION

Figure 1:
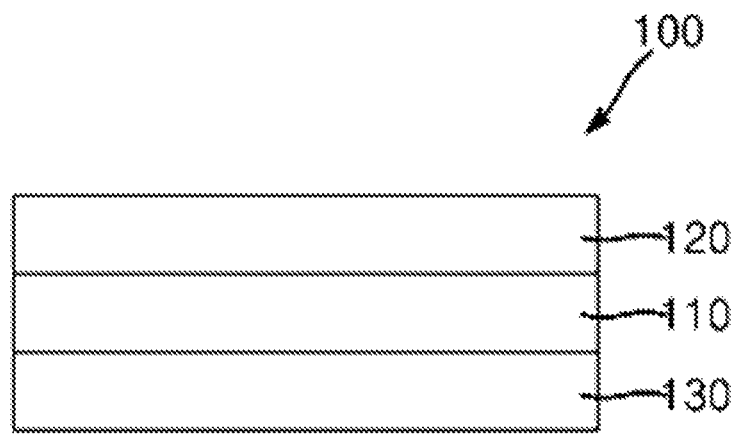
FIG. 1 is a schematic cross-sectional view of a polarizing plate according to embodiments of the present invention.

Embodiments of the present invention are described with reference to the accompanying drawings. It should be understood that the present invention may be embodied in different ways and is not limited to the following embodiments. In the drawings, portions irrelevant to the description are omitted for clarity. Like components are denoted by like reference numerals throughout the specification. As used herein, terms such as "upper" and "lower" are defined with reference to the accompanying drawings. Thus, it is understood that the term "upper side" can be used interchangeably with the term "lower side".

Hereinafter, a polarizing plate according to embodiments of the present invention is described with reference to the accompanying drawings.

FIG. 1 is a schematic cross-sectional view of a polarizing plate according to embodiments of the present invention. Referring to FIG. 1, the polarizing plate 100 includes a polarizer 110, a polyester film 120, and an optical film 130. The polyester film 120 may have a ratio of machine direction (MD) elongation to transverse direction (TD) elongation of about 1:6 or greater. When the polyester film has a ratio of MD elongation to TD elongation of about 1:6 or greater, the polarizing plate can avoid (or reduce) the appearance of rainbow spots and deteriorations in the degree of polarization.

The polyester film 120 is placed opposite a liquid crystal display panel (not shown in FIG. 1) and is formed on an upper side of the polarizer 110. In other words, when the polarizing plate is mounted on the liquid crystal display panel, the polyester film 120 is placed at the outermost portion to protect the polarizer and provide optical effects to the polarizing plate. The polyester film may have a ratio of MD elongation to TD elongation of about 1:6 or greater, for example about 1:6 to about 1:30, about 1:10 to about 1:30, about 1:11 to about 1:30, about 1:12 to about 1:30, about 1:11 to about 1:25, about 1:12 to about 1:25, or about 1:12 to about 1:15. When the TD elongation of the polyester film is greater than the MD elongation of the polyester film, the polyester film can have good mechanical properties and thus exhibit enhanced productivity and processability. In addition, when the ratio of MD elongation to TD elongation of the polyester film satisfies any of the above ranges, the polyester film can maintain a degree of polarization as high as 99.99% or greater and reduce the occurrence of rainbow spots.

Figure 4:
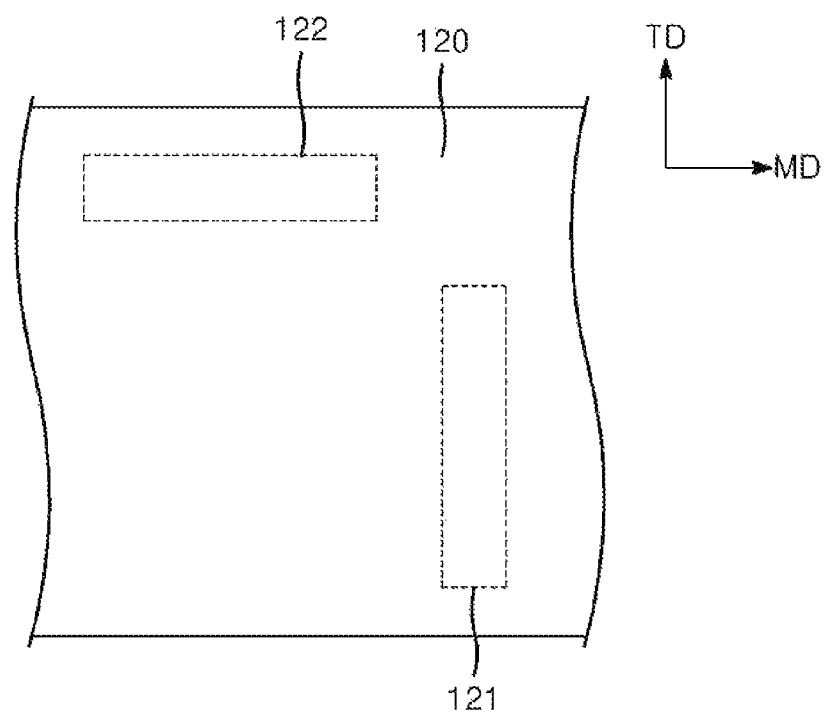
FIG. 4 is a schematic diagram of a sample used to measure the ratio of MD elongation to TD elongation.

FIG. 4 is a diagram of a sample used to measure the ratio of MD elongation to TD elongation. Next, the 'ratio of MD elongation to TD elongation' will be described with reference to FIG. 4. First, the MD and TD are orthogonal to each other. The 'ratio of MD elongation to TD elongation' is determined using MD elongation (%) and TD elongation (%). Each of the MD elongation (%) and TD elongation (%) are measured from samples. A rectangular sample 1 for measurement of TD elongation 121 (having dimensions of length×width of 150 mm×25 mm, where length and width correspond to the TD and MD, respectively) and a rectangular sample 2 for measurement of MD elongation 122 (having dimensions of length×width of 150 mm×25 mm, where length and width correspond to MD and TD, respectively) are taken from the polyester film 120. Taking the initial length of each of the samples as $L_0$, and the final length of each of the samples (obtained by stretching in a longitudinal direction at a rate of 100 mm/min using a universal test machine (UTM)) as $L_1$, the elongation value may be calculated by Equation 4.

$$\text{Elongation}(\%) = \{(L_1 - L_0)/L_0\} \times 100 \quad (4)$$

In Equation 4, $L_0$ denotes the initial length of the sample, and $L_1$ denotes the final length of the sample obtained by stretching the sample in a longitudinal direction at a rate of 100 mm/min using a UTM.

TD elongation 121 is found from the sample 1, and MD elongation 122 is found from the sample 2, and these values are used to calculate the ratio of MD elongation to TD elongation.

Each of the samples may have a thickness of about 40 μm to about 100 μm.

The polyester film 120 may have a crystallinity of greater than or equal to about 50% and lower than or equal to about 100%. For example, the polyester film may have a crystallinity of about 50% to about 100%, about 60% to about 100%, about 50% to about 99.99%, about 60% to about 99.99%, about 60% to about 90%, about 60% to about 80%, or about 60% to about 70%. As used herein, the term "crystallinity" may refer to the area percentage of the polyester film that is crystalline, i.e., a percentage of the area of both amorphous and crystalline regions of the film that are crystalline. When the crystallinity of the polyester film satisfies the above ranges, it is possible to reduce shrinkage of the polyester film and the polarizer. In this case, the polarizer does not impede the path of light passing through the transmission axis thereof, and thus can prevent (or reduce) deteriorations in the degree of polarization of the polarizing plate.

Figure 2:
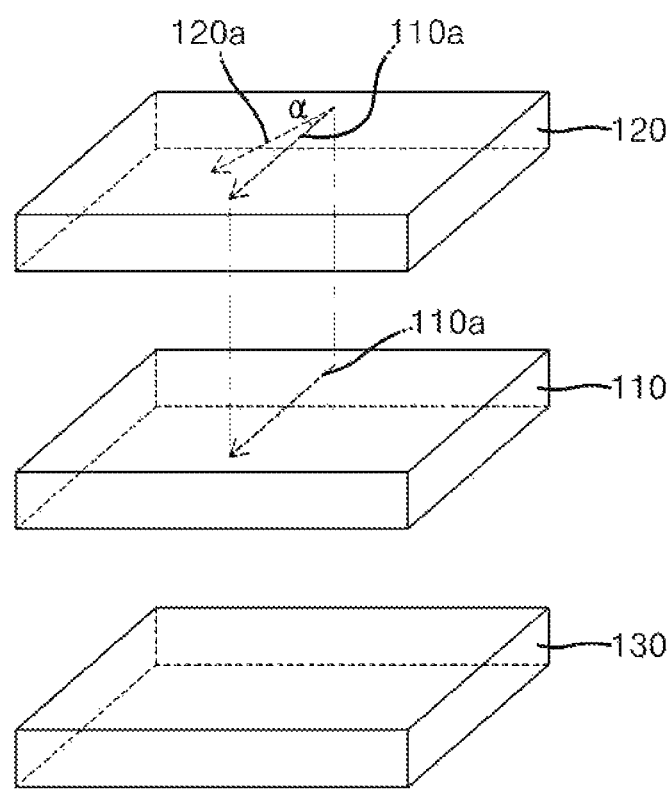
FIG. 2 is an exploded-out perspective view of a polarizing plate according to embodiments of the present invention.

FIG. 2 is an exploded-out perspective view of the polarizing plate according to embodiments of the present invention. In the polarizing plate depicted in FIG. 2, an angle between the transmission axis of the polarizer and the TD of the polyester film is within a specified range in order to increase the degree of polarization. Referring to FIG. 2, in the polarizing plate 100, an angle α between the transmission axis 110a of the polarizer 110 and the TD 120a of the polyester film 120 may range from about −7° to about +7°, from about −5° to about +5°, or from about −3° to about +3°, for example about 0°. Within these ranges, the polarizing plate can exhibit a high degree of polarization.

In addition, the polarizer 110 may be stretched in the MD. Here, an angle between the MD of the polarizer 110 and the TD of the polyester film 120 may be about 90±7°, about 90°±5°, about 90°±3°, or about 90°. Within these ranges, and since an angle of about 90° is defined between the stretching direction of the polarizer 110 and the stretching direction of the polyester film 120, it is possible to prevent (or reduce) unidirectional shrinkage of the film and warping of the polarizing plate.

The polyester film 120 may be formed of a transparent resin. The transparent resin may include at least one of a polyethylene terephthalate (PET) resin, a polybutylene terephthalate resin, a polyethylene naphthalate resin, and/or a polybutylene naphthalate resin, but the transparent resin is not limited thereto. The polyester film may have a thickness of about 10 μm to about 150 μm. Within this range, the polyester film can be used in a polarizing plate.

In some embodiments, the polyester film 120 may be fabricated by uniaxially stretching an unstretched polyester film to a stretching ratio of about 6 or greater in the TD. When the polyester film is TD stretched to an elongation in the above range, it is possible to improve productivity and processability of the film and to suppress (or reduce) the occurrence of rainbow spots while also preventing deteriorations in the degree of polarization. For example, the polyester film may be fabricated by melt extrusion of polyester pellets to obtain an unstretched polyester film, followed by stretching the obtained unstretched polyester film. For example, the obtained unstretched polyester film may be stretched in the TD while heating to a temperature ranging from (Tg−20°) C. to (Tg+50°) C. (where Tg is the glass transition temperature of the polyester resin), followed by heat setting by cooling or the like. For example, the obtained unstretched polyester film may be stretched to a stretching ratio of about 6 to about 30. Within this range, it is possible to reduce the occurrence of rainbow spots and maintain a high degree of polarization.

Stretching may be performed by dry stretching, wet stretching, or a combination thereof. In some embodiments, stretching is performed by dry stretching to allow control over stress with respect to restoration of the polyester film, thereby reducing dimensional variations. Here, dry stretching may include stretching the unstretched polyester film while heating the film to a temperature ranging from about (Tg−20°) C. to about (Tg+50°) C. without moisture. The dry-stretched polyester film may be cooled at a cooling rate of about 50° C./sec to about 80° C./sec. Within this cooling rate range, the polyester film can exhibit further enhanced crystallinity. In this case, it is possible to suppress (or reduce) the occurrence of rainbow spots and deteriorations in the degree of polarization.

For example, the obtained polyester film may not be separately stretched in the MD. Even in this example, the polyester film can be stretched to a stretching ratio of about 0.8 to about 1.3 in the MD by rolls depending upon the process conditions.

The polyester film 120 has high retardation and thus can further reduce the occurrence of rainbow spots. For example, the polyester film 120 may have an in-plane retardation (Re) at a wavelength of 550 nm of about 5,000 nm to about 15,000 nm, as calculated by Equation 1, and an out-of-plane retardation (Rth) at a wavelength of 550 nm of about 6,000 nm to about 18,000 nm, as calculated by Equation 2. Additionally, the polyester film 120 may have a degree of biaxiality (NZ) at a wavelength of 550 nm of about 1.0 to about 1.8, as calculated by Equation 3. Within these ranges, the polyester film has high retardation and thus can suppress (or reduce) the occurrence of rainbow spots and can exhibit little variation in retardation and dimensions even when exposed to a high temperature/high humidity external environment, thereby providing good optical properties. In this case, it is possible to maintain improved (or optimal) image quality.

Equation 1

$$Re=(nx-ny)\times d \qquad (1)$$

Equation 2

$$Rth=[\{(nx+ny)/2\}-nz]\times d \qquad (2)$$

Equation 3

$$NZ=(nx-nz)/(nx-ny) \qquad (3)$$

In Equations 1, 2 and 3, nx, ny, and nz are the indices of refraction in the x-, y- and z-axis directions of the polyester film, respectively, and d is a thickness of the film in nm.

In particular, nx, ny and nz are the indices of refraction at a wavelength of 550 nm in the MD (x-axis), TD (y-axis) and thickness direction (z-axis) of the polyester film, respectively, and the x-axis, the y-axis and the z-axis are orthogonal to one another.

In order to achieve the retardation values reported above, the polyester film 120 may be fabricated by a process in which polyester pellets are subjected to melt extrusion to prepare a polyester base film, followed by quenching using cooling rolls. The quenched film is then stretched to a stretching ratio of about 2 to about 10 in the TD at about 70° C. to about 150° C. and stabilized by heat setting, followed by cooling at a cooling rate of about 50° C./sec to about 80° C./sec.

The polyester film 110 may further include a functional coating layer (not shown) on an upper surface thereof. The functional coating layer may include at least one of a hard coating layer, an anti-reflection layer, and/or an anti-fingerprint layer. The functional layer may have a thickness of about 1 μm to about 10 μm. Within this thickness range of the functional layer, the polyester film can be applied to the polarizing plate when stacked on the polarizer.

In addition, the polyester film 110 may further include a surface coating layer (not shown) on a lower surface thereof. The polyester film has a hydrophobic surface. In order to use such a polyester film in the polarizing plate, the surface coating layer may surface modified by converting the hydrophobic surface into a hydrophilic surface. Such a polyester film may be applied to the polarizing plate. The surface coating layer may include a primer having hydrophobic and hydrophilic functional groups. The primer may make it possible to prevent (or reduce) insufficient modification or damage to the surface of the film due to modification.

The primer having hydrophobic and hydrophilic functional groups may include, for example, polyester resins, polyvinyl acetate resins, and combinations thereof, but is not limited thereto. The surface coating layer improves the mechanical properties and moisture permeability of the protective film (polyester film), allowing the polarizing plate to exhibit high resistance to severe external conditions.

In some embodiments, the surface coating layer may be formed on one or both surfaces of the polyester film. In this case, it is possible to further improve the mechanical properties and moisture permeability of the polyester film.

In some embodiments, the surface coating layer may be formed between the polyester film and the polarizing plate to improve adhesion between the polyester film and the polarizer. In this case, the polarizing plate can exhibit high resistance to harsh external conditions.

The polarizer 110 allows transmission of light travelling in a specific direction therethrough. The polarizer may be fabricated by dyeing a polyvinyl alcohol (PVA) film with iodine or a dichroic dye, followed by stretching the polyvinyl alcohol film in the MD. Specifically, the polarizer may be fabricated by swelling, dyeing, stretching, and crosslinking. Each process of the method of fabricating a polarizer is generally known to those skilled in the art.

In some embodiments, the polarizer may be fabricated by a process in which a polyvinyl alcohol film (e.g., having a polymerization degree of about 2,000 to about 3,000, a saponification degree of about 80% to about 100%, and a thickness of about 10 μm to 80 μm) is subjected to swelling at about 20° C. to about 80° C., followed by dyeing in a 0.1 wt % to 5.0 wt % aqueous iodine solution, and stretching to an elongation of about 1.0 to about 8.0. Stretching of the polarizer may be performed by dry stretching, wet stretching, or a combination thereof. Dry stretching may be performed at about 20° C. to about 100° C., and wet stretching may be performed in an aqueous solution at about 20° C. to about 80° C.

The polarizer 110 may have a thickness of about 3 μm to about 30 μm. Within this range, the polarizer can be used in a thin liquid crystal display.

An optical film 130 may be formed on a lower side of the polarizer to protect the polarizer. The optical film allows the polarizing plate to be mounted on a liquid crystal display panel via an adhesive. Although not shown in FIG. 1, the optical film 130 may be formed on a liquid crystal display panel through an adhesive layer formed on a lower surface thereof. The adhesive layer may be formed of any suitable adhesive for a polarizing plate, for example, an adhesive including a (meth)acrylic resin.

The optical film 130 has a retardation value in a specified range in order to compensate for viewing angle. In some embodiments, the optical film may have a front retardation at a wavelength of 550 nm of about 30 nm to about 100 nm. Within this range of front retardation, the optical film can provide an enlarged viewing angle by compensating for birefringence occurring in the liquid crystal cell upon transmission of light through the liquid crystals, and can provide black and white compensation.

The optical film 130 is a transparent optical film formed of a polyester film or a non-polyester film. For example, the optical film may be formed of at least one of a cellulose resin (such as triacetyl cellulose or the like), a polyester resin (such as polyethylene terephthalate, polybutylene terephthalate, polyethylene naphthalate, polybutylene naphthalate or the like), a cyclic polyolefin resin, a polycarbonate resin, a polyethersulfone resin, a polysulfone resin, a polyamide resin, a polyimide resin, a polyolefin resin, a polyarylate resin, a polyvinyl alcohol resin, a polyvinyl chloride resin, and/or a polyvinylidene chloride resin. The optical film may have a thickness of about 10 μm to about 500 μm. Within this range, the optical film can be used in a polarizing plate for liquid crystal displays.

Although not shown in FIG. 1, an adhesive layer may be formed between the polarizer and the polyester film, and/or between the polarizer and the optical film to improve the mechanical strength of the polarizing plate.

The adhesive layer may include any suitable adhesive, for example, at least one of a water-based adhesive, a pressure-sensitive adhesive, and/or a solvent-free adhesive such as a photocurable adhesive. For example, the water-based adhesive may include a polyvinyl alcohol adhesive resin and a curing agent, and the solvent-free adhesive may include, for example, about 90 wt % to about 95 wt % of a (meth)acrylic adhesive resin and about 5 wt % to about 10 wt % of an isocyanate curing agent. Within these ranges, the adhesive layer can enhance adhesion between the polarizer and the polyester film or the optical film. For example, as the adhesive, a photocurable adhesive may be used. In this case, adhesion may be achieved using at least two acrylic resins and/or epoxy resins together with a photocuring initiator.

The polarizing plate may be fabricated by any suitable method. For example, the polarizing plate may be fabricated by a process in which the adhesive is applied to both surfaces of the polarizer, followed by drying and/or curing subsequent to lamination of the polyester film and the optical film.

The polarizing plate may have a thickness of about 25 μm to about 500 μm. Within this range, the polarizing plate can be used in a polarizing plate for liquid crystal displays. The polarizing plate may have a degree of polarization of about 99.99% or greater, for example, about 99.99% to about 99.999%, and a transmittance of about 40% or greater, for example, about 40% to about 80%. Within these ranges, the polarizing plate does not cause (or causes a reduced amount of) deterioration in optical properties when mounted on a liquid crystal display.

Figure 3:
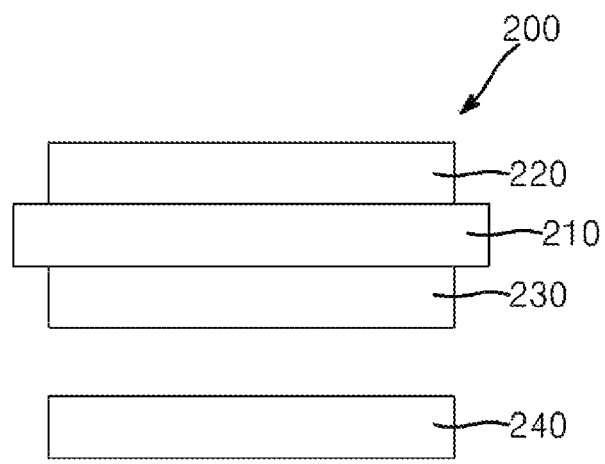
FIG. 3 is a schematic cross-sectional view of a liquid crystal display according to embodiments of the present invention.

Next, a liquid crystal display according to embodiments of the invention is described with reference to FIG. 3. FIG. 3 is a schematic cross-sectional view of a liquid crystal display according to embodiments of the present invention.

Referring to FIG. 3, a liquid crystal display (LCD) module 200 includes an LCD panel 210, a first polarizing plate 220 formed on an upper surface of the LCD panel 210, and a second polarizing plate 230 formed on a lower surface of the LCD panel 210 between the LCD panel 210 and a light source 240. At least one of the first and second polarizing plates 220, 230 may be the polarizing plate according to embodiments of the invention.

The LCD panel 210 includes a liquid crystal panel, which includes a liquid crystal cell layer encapsulated between a first substrate (not shown in FIG. 3) and a second substrate (not shown in FIG. 3). The first and second polarizing plates may be stacked on the surfaces of the first and second substrates, respectively. In some embodiments, the first substrate may be a color filter (CF) substrate (upper substrate), and the second substrate may be a thin film transistor (TFT) substrate (lower substrate).

The first substrate and the second substrate may be formed of the same or different materials, and may be glass substrates or plastic substrates. The plastic substrates may be formed of any plastic material suitable for flexible displays, for example, a polyethylene terephthalate (PET), a polycarbonate (PC), a polyimide (PI), a polyethylene naphthalate (PEN), a polyether sulfone (PES), a polyarylate (PAR), or a cycloolefin copolymer (COC), but the plastic substrates are not limited thereto.

The liquid crystal cell layer may include liquid crystal cells arranged in a mode selected from among a vertical alignment (VA) mode, an in-place switching (IPS) mode, a fringe field switching (FFS) mode, and a twisted nematic (TN) mode.

Although not shown in FIG. 3, adhesive layers may be formed between the LCD panel and the first polarizing plate and between the LCD panel and the second polarizing plate, respectively. The adhesive layers may be formed of any suitable adhesive (for example, a (meth)acrylic resin-containing adhesive).

Hereinafter, embodiments of the present invention are described with reference to some examples. It is understood that these examples are provided for illustration only and are not to be construed in any way as limiting the present invention.

The components used in the following examples and comparative examples are as follows:

(1) Material for polarizer: Polyvinyl alcohol film (polymerization degree: 2,400, saponification degree: 98%, thickness: 60 μm, Kuraray Co., Ltd., Japan)

(2) Polyester film: Polyethylene terephthalate film having a crystallinity and elongation ratio as shown in Table 1

(3) Optical film: COP film (thickness: 50 μm, Zeon Co., Ltd., Japan)

(4) Adhesive: Solvent-free adhesive (HE-82MS, Samsung SDI)

Example 1

A polyvinyl alcohol film was subjected to swelling in a swelling bath containing an aqueous solution at 25° C. to 35° C., stretching to an MD stretching ratio of 3.0 at 60° C., iodine adsorption in a 0.6 wt % aqueous iodine solution, and stretching to an MD stretching ratio of 2.5 in a boric acid solution at 40° C., thereby fabricating a polarizer (thickness: 22 μm).

A polyethylene terephthalate film having a crystallinity and elongation ratio as shown in Table 1 was bonded to an upper surface of the polarizer using a solvent-free adhesive such that the TD of the polyethylene terephthalate film corresponded to the transmission axis of the polarizer, followed by bonding a COP film to a lower surface of the polarizer using a solvent-free adhesive, thereby fabricating a polarizing plate.

Example 2

A polarizing plate was fabricated as in Example 1 except that the polyethylene terephthalate film was modified as listed in Table 1.

Comparative Examples 1 to 3

Polarizing plates were fabricated as in Example 1 except that the polyethylene terephthalate film was modified as listed in Table 1.

was cut to a size of 10 cm×10 cm (length×width) and measured as to crystallinity with respect to the MD by X-ray diffraction (XRD) (X'Pert Pro, Philips).

Elongation ratio: From each of the polyethylene terephthalate films according to the Examples and Comparative Examples, a rectangular sample 1 (having dimensions of length×width of 150 mm×25 mm, where length and width correspond to the TD and MD, respectively) and a rectangular sample 2 (having dimensions of length×width of 150 mm×25 mm, where length and width correspond to MD and TD, respectively) were taken. Taking the initial length of each sample as $L_0$, and the final length of each sample (obtained by stretching in a longitudinal direction at a rate of 100 mm/min using a universal test machine (UTM)) as $L_1$, elongation was calculated by the Equation: Elongation (%)=$\{(L_1-L_0)/L_0\}\times 100$. TD elongation was taken from the sample 1, and MD elongation was taken from the sample 2, and these values were used to calculate the ratio of MD elongation to TD elongation.

The polarizing plates fabricated according to the Examples and Comparative Examples were evaluated for the occurrence of rainbow spots and the degree of polarization, and the results are shown in Table 1, below.

TABLE 1

|  | PET film | | | | Angle between transmission axis of polarizer and TD of PET film | Occurrence of rainbow spots | Degree of polarization (%) |
| --- | --- | --- | --- | --- | --- | --- | --- |
|  | Stretching direction | TD elongation | Elongation ratio | Crystallinity (%) | | | |
| Example 1 | TD uniaxial | 6 | 6.3 | 60 | ±6.7° | x | 99.994 |
| Example 2 | TD uniaxial | 7.2 | 12 | 70 | ±3.1° | x | 99.997 |
| Comp. Example 1 | Un-stretched | Un-stretched | 1 | 20 | ±41° | ⊚ | 99.970 |
| Comp. Example 2 | TD uniaxial | 3 | 3.5 | 30 | ±22° | ⊚ | 99.980 |
| Comp. Example 3 | TD uniaxial | 5 | 4.7 | 40 | ±9.3° | ○ | 99.985 |

Comparative Example 4

A polyvinyl alcohol film was subjected to swelling in a swelling bath containing an aqueous solution at 25° C. to 35° C., stretching to a stretching ratio of 3.0 at 60° C., iodine adsorption in a 0.6 wt % aqueous iodine solution, and stretching to an elongation of 2.5 in a boric acid solution at 40° C., thereby fabricating a polarizer (thickness: 22 μm).

A polyethylene terephthalate film having a crystallinity and elongation ratio as shown in Table 1 was bonded to an upper surface of the polarizer using a solvent-free adhesive such that the MD of the polyethylene terephthalate film corresponded to the transmission axis of the polarizer, followed by bonding a COP film to a lower surface of the polarizer using a solvent-free adhesive, thereby fabricating a polarizing plate.

Crystallinity: Each of the polyethylene terephthalate films according to the Examples and Comparative Examples As shown in Table 1, the polarizing plates according to the Examples (i.e., according to embodiments of the present invention) did not suffer from rainbow spots and exhibited minimized deteriorations in the degree of polarization. On the contrary, the polarizing plates of Comparative Examples 1 to 3 (having an elongation ratio outside the ranges according to embodiments of the present invention) suffered from rainbow spots and exhibited relatively low degrees of polarization as compared to the polarizing plates of the Examples.

(1) Occurrence of rainbow spots: The polarizing plates were placed on an upper surface of an LCD panel operating in a VA mode, and between a lower surface of the LCD panel and a backlight unit, and assembled thereto. The occurrence of rainbow spots was observed using a spectroradiometer (SR-3A, Topcon Co., Ltd.). No occurrence of rainbow spots was rated as x, slight occurrence of rainbow spots was rated as Δ, mid-range occurrence of rainbow spots was rated as ○, and severe occurrence of rainbow spots was rated as ⊚.

(2) Degree of polarization: For each of the polarizing plates, the degree of polarization was measured using a V-7100 spectrophotometer (JASCO Corporation, Japan).

While certain exemplary embodiments of the present invention have been illustrated and described, it is understood that various modifications, changes, and alterations can be made to the described embodiments without departing from the spirit and scope of the invention, as defined in the following claims.

What is claimed is:

1. A polarizing plate, comprising:

a polarizer; and a stretched polyester film on a first side of the polarizer, the polyester film having a stretched direction corresponding to a transverse direction (TD) of the film, the polyester film having a ratio of machine direction (MD) elongation ($Elongation_{MD}$) to transverse direction (TD) elongation ($Elongation_{TD}$) of about 1:6 to about 1:30, wherein the MD elongation is calculated by Equation 4MD and the TD elongation is calculated by Equation 4TD:

$$Elongation_{MD}(\%) = \{(L_{1MD} - L_{0MD})/L_{0MD}\} \times 100, \quad \text{Equation 4MD}$$

wherein, in Equation 4MD, $L_{0MD}$ denotes an initial MD length, and $L_{1MD}$ denotes a final MD length after stretching of the polyester film using a universal test machine at a rate of 100 mm/min;

$$Elongation_{TD}(\%) = \{(L_{1TD} - L_{0TD})/L_{0TD}\} \times 100, \quad \text{Equation 4TD}$$

wherein, in Equation 4TD, $L_{0TD}$ denotes an initial TD length, and $L_{1TD}$ denotes a final TD length after stretching of the polyester film using a universal test machine at a rate of 100 mm/min, wherein an angle between a transmission axis of the polarizer and the TD of the polyester film ranges from about −7° to about +7°, and wherein the polarizing plate has a degree of polarization of 99.99% or greater.

2. The polarizing plate according to claim 1, wherein the polyester film has a crystallinity of about 50% to about 100%.

3. The polarizing plate according to claim 1, wherein the polyester film has an in-plane retardation (Re) at a wavelength of 550 nm of about 5,000 nm to about 15,000 nm, as calculated by Equation 1, and an out-of-plane retardation (Rth) at a wavelength of 550 nm of about 6,000 nm to about 18,000 nm, as calculated by Equation 2:

Equation 1

$$Re = (nx - ny) \times d \quad (1)$$

Equation 2

$$Rth = [\{(nx + ny)/2\} - nz] \times d \quad (2)$$

wherein:

nx, ny, and nz are indices of refraction in the MD, the TD, and a thickness direction of the polyester film, respectively, the MD defining an x-axis, the TD defining a y-axis, and the thickness direction defining a z-axis;

the x-axis, the y-axis, and the z-axis are orthogonal to one another; and d is a thickness of the film in nm.

4. The polarizing plate according to claim 1, wherein the polyester film has a degree of biaxiality (NZ) at a wavelength of 550 nm of about 1.0 to about 1.8, as calculated by Equation 3:

$$NZ = (nx - nz)/(nx - ny) \quad (3)$$

wherein:

nx, ny, and nz are indices of refraction in the MD, the TD, and a thickness direction of the polyester film, respectively, the MD defining an x-axis, the TD defining a y-axis, and the thickness direction defining a z-axis; and the x-axis, the y-axis, and the z-axis are orthogonal to one another.

5. The polarizing plate according to claim 1, wherein the polyester film comprises at least one of a polyethylene terephthalate (PET) resin, a polybutylene terephthalate resin, a polyethylene naphthalate resin, and a polybutylene naphthalate resin.

6. The polarizing plate according to claim 1, further comprising:

an adhesive layer comprising a solvent-free adhesive between the polarizer and the polyester film.

7. The polarizing plate according to claim 6, wherein the solvent-free adhesive comprises about 90 wt % to about 95 wt % of a (meth)acrylic adhesive resin and about 5 wt % to about 10 wt % of an isocyanate curing agent.

8. The polarizing plate according to claim 1, further comprising:

an optical film on a second side of the polarizer.

9. A liquid crystal display comprising the polarizing plate according to claim 1.

* * * * *